(12) United States Patent
Mueller

(10) Patent No.: US 11,383,320 B2
(45) Date of Patent: Jul. 12, 2022

(54) METHOD FOR POSITIONING WELD METAL IN AN ULTRASONIC WELDING DEVICE AND ULTRASONIC WELDING DEVICE

(71) Applicant: SCHUNK SONOSYSTEMS GMBH, Wettenberg (DE)

(72) Inventor: Stefan Mueller, Wetzlar (DE)

(73) Assignee: SCHUNK SONOSYSTEMS GMBH, Wettenberg (DE)

( * ) Notice: Subject to any disclaimer, the term of this patent is extended or adjusted under 35 U.S.C. 154(b) by 163 days.

(21) Appl. No.: 16/648,738

(22) PCT Filed: Aug. 27, 2018

(86) PCT No.: PCT/EP2018/072969
§ 371 (c)(1),
(2) Date: Mar. 19, 2020

(87) PCT Pub. No.: WO2019/057443
PCT Pub. Date: Mar. 28, 2019

(65) Prior Publication Data
US 2020/0269347 A1 Aug. 27, 2020

(30) Foreign Application Priority Data
Sep. 25, 2017 (DE) .................. 10 2017 216 988.5

(51) Int. Cl.
*B23K 20/10* (2006.01)
*B29C 65/08* (2006.01)

(52) U.S. Cl.
CPC .................................. *B23K 20/10* (2013.01)

(58) Field of Classification Search
None
See application file for complete search history.

(56) References Cited

U.S. PATENT DOCUMENTS 4,834,827 A * 5/1989 Obeda ................ B23K 37/0533
156/352
6,628,408 B1 * 9/2003 Franklin ................ B29C 65/087
356/623

(Continued)

FOREIGN PATENT DOCUMENTS

CN 1494753 A 5/2004
CN 101304883 A 11/2008
(Continued)

OTHER PUBLICATIONS

Baboi et al., "Evaluation of Amplitude Stepping in Ultrasonic Welding", Welding Journal, vol. 89, Aug. 2010, p. 161-165-s (Year: 2010).*

*Primary Examiner* — Devang R Patel
(74) *Attorney, Agent, or Firm* — Dickinson Wright PLLC; Andrew D. Dorisio

(57) ABSTRACT

The invention relates to a method for positioning weldments (20) in an ultrasonic welding device (34) and to an ultrasonic welding device comprising a sonotrode (14), to which ultrasonic vibrations are applied and which emits longitudinal vibrations, and an anvil (16), a weldment accommodation (19) being formed between a work surface (17) of the sonotrode (14) and an opposing surface (18) of the anvil (16), a change in position Δx of a positioning device (21) defining weld position P of the weldment (20) being captured in the longitudinal direction (22) of the sonotrode (14) by means of a position sensor, the application of vibrations to the sonotrode (14) being changed such depending on the change in position Δx that a change in amplitude Δy is performed according to an amplitude characteristic curve of the sonotrode (14).

6 Claims, 3 Drawing Sheets

(56) References Cited

U.S. PATENT DOCUMENTS

| | | | | |
|---|---|---|---|---|
| 8,858,742 | B2* | 10/2014 | Spicer | B29C 65/08 |
| | | | | 156/64 |
| 9,283,713 | B2* | 3/2016 | Heeg | B29C 66/232 |
| 9,427,914 | B2* | 8/2016 | Heeg | B29C 65/08 |
| 2012/0158168 | A1* | 6/2012 | Khakhalev | B23K 20/24 |
| | | | | 700/108 |
| 2014/0338814 | A1 | 11/2014 | Klinstein et al. | |
| 2015/0158247 | A1* | 6/2015 | Heeg | B29C 66/83411 |
| | | | | 156/73.1 |
| 2017/0225275 | A1* | 8/2017 | Hwang | B23K 31/125 |

FOREIGN PATENT DOCUMENTS

| | | |
|---|---|---|
| CN | 101374649 A | 2/2009 |
| CN | 104690413 A | 6/2015 |
| CN | 105339124 A | 2/2016 |
| CN | 107073521 A | 8/2017 |
| DE | 4335108 C1 | 1/1995 |
| DE | 102010050387 A1 | 6/2011 |
| DE | 202015008931 U1 | 3/2016 |
| JP | 5443588 A | 4/1979 |
| WO | 2005107994 A2 | 11/2005 |

\* cited by examiner

METHOD FOR POSITIONING WELD METAL IN AN ULTRASONIC WELDING DEVICE AND ULTRASONIC WELDING DEVICE

FIELD OF THE INVENTION

The invention relates to a method for positioning weldments in an ultrasonic welding device comprising a sonotrode, to which ultrasonic vibrations are applied and which emits longitudinal vibrations, and an anvil, a weldment accommodation being formed between a work surface of the sonotrode and an opposing surface of the anvil, a change in position of a positioning device defining the weld position of the weldment being captured in the longitudinal direction of the sonotrode by means of a position sensor. Moreover, the invention relates to an ultrasonic welding device comprising a sonotrode, to which ultrasonic vibrations of an ultrasonic generator are applied and which emits longitudinal vibrations, and an anvil, a weldment accommodation being formed between a work surface of the sonotrode and an opposing surface of the anvil, the ultrasonic welding device comprising a positioning device for capturing the weld position of the weldment in the longitudinal direction of the sonotrode with respect to the work surface, the positioning device being provided with a position sensor for capturing the weld position.

BACKGROUND OF THE INVENTION

Ultrasonic welding devices of the type mentioned above are used in particular in ultrasonic welding tongs for implementing end welds on metallic pipes, for example, implemented as fluid pipes in cooling units, i.e., in particular in air conditioning devices or refrigerators. Such end welds are implemented after filling a cooling agent into a cooling circuit comprising the fluid pipes in such a manner that a filling armature disposed on a free end of the pipe is detached from the pipe end at the same time end weld is severed.

In order to enable an exact positioning of the weldment, which is realized as a pipe as mentioned above, between the work surface of the sonotrode and the opposing surface of the anvil, a positioning device commonly realized as an abutment is provided on a casing of the ultrasonic welding device and abuts against the pipe in the weld position so that the axial position of the pipe is defined in the longitudinal direction of the sonotrode.

As the work surface of the sonotrode and the opposing surface of the anvil become worn during operation due to the ultrasonic vibrations causing relative movements between the weldment and the sonotrode and the anvil, respectively, it is imperative to change the weld position in the course of operation. This generally occurs by displacing the positioning device, which is realized as an abutment, relatively in the longitudinal direction of the sonotrode.

For producing replicable welds which remain constant within the parameters, it is thus all the more required to take into consideration how the size of the vibration amplitude depends on the weld position and to appropriately correct the amplitude in the new weld position, if necessary, in order to ensure that vibration amplitudes of equal size are applied to the weldment independently of the weld position.

So far the correction of amplitude, i.e., the change in amplitude after a change of the weld position, has been implemented iteratively by the user in such a manner that the yielded weld result, i.e., the maintaining of determined welding parameters at the weld, is examined after having changed the weld position, and that if there are unwarranted deviations, the amplitude is changed by changing the converter settings in order to verify by means of a subsequently produced weld whether the implemented change was sufficient for maintaining permitted parameter tolerances. This correlates with a significant time allotment since a three- to fourfold change of the weld position will generally be necessary during shift production due to the high number of implemented welds.

SUMMARY OF THE INVENTION

The object of the invention at hand is to propose a method for positioning weldments in an ultrasonic welding device which facilitates implementing changes in the weld position while simultaneously maintaining the quality of the welds. Moreover, the object of the invention at hand is to propose an ultrasonic welding device which facilitates implementing a corresponding method.

According to the invention, the application of vibrations to the sonotrode is changed depending on the change in position $\Delta x$ such that a change in amplitude is performed according to an amplitude characteristic curve of the sonotrode.

The invention is based on the findings that individual amplitude characteristic curves are derived for different sonotrodes owing to the material properties and the geometry of a sonotrode, meaning that the vibration amplitude of the sonotrode changes in the longitudinal direction of the sonotrode or in the longitudinal direction of the work surface of the sonotrode, the amplitude generally achieving a relative maximum and a relative minimum at the free end of the sonotrode or more specifically at the end of the work surface allocated at the free end of the sonotrode and at the opposing end of the work surface, respectively. Between the location-dependent maximum and minimum of the amplitude, the amplitude sequence is defined by the amplitude characteristic curve.

Preferably, the application of vibrations to the sonotrode is changed by changing the control voltage of a generator controlling a converter which applies ultrasonic vibrations to the sonotrode.

The point in time when to implement the change in position can depend on different parameters.

Preferably, a particularly simple manner of triggering the change in position of the position element consists of specifying a defined number of weld sequences. Thus, it can be specified, for example, that a position is changed after every thousand implemented weld sequences in order to ultimately attain an as even as possible wear of the work surface in the longitudinal direction of the sonotrode and/or of the opposing surface of the anvil while using the respective surfaces to the greatest possible extent.

The simplest way to trigger a change in position is by the user of the ultrasonic welding device determining the timing, this way appearing particularly expedient if the user is experienced in implementing weld sequences by means of an ultrasonic welding device.

According to the invention, the position sensor is connected such to a generator of the ultrasonic welding device via a characteristic curve processor that an amplitude is changed depending on a change in position $\Delta x$ according to the amplitude characteristic curve of the sonotrode by means of the characteristic curve processor.

The characteristic curve processor offers the possibility of storing an amplitude characteristic curve specific to the sonotrode in a storage, which is allocated to the processor, depending on the amplitude size across the length of the sonotrode work surface in the longitudinal direction of the sonotrode, and of determining a change in the amplitude size by means of a comparison between the amplitude size of the second weld position given after the change in position and the amplitude size at a first weld position preceding a change in position, and of adjusting the amplitude size in the second weld position to the amplitude size in the first weld position via a corresponding change in the converter setting, for example.

Preferably, the characteristic curve processor is developed in a computer which is connected to a generator controlling a converter which applies ultrasonic vibrations to the sonotrode.

BRIEF DESCRIPTION OF THE DRAWINGS FIGURES

In the following, an embodiment of the invention is described in more detail with reference to the drawing.

DETAILED DESCRIPTION OF THE INVENTION

Figure 1:
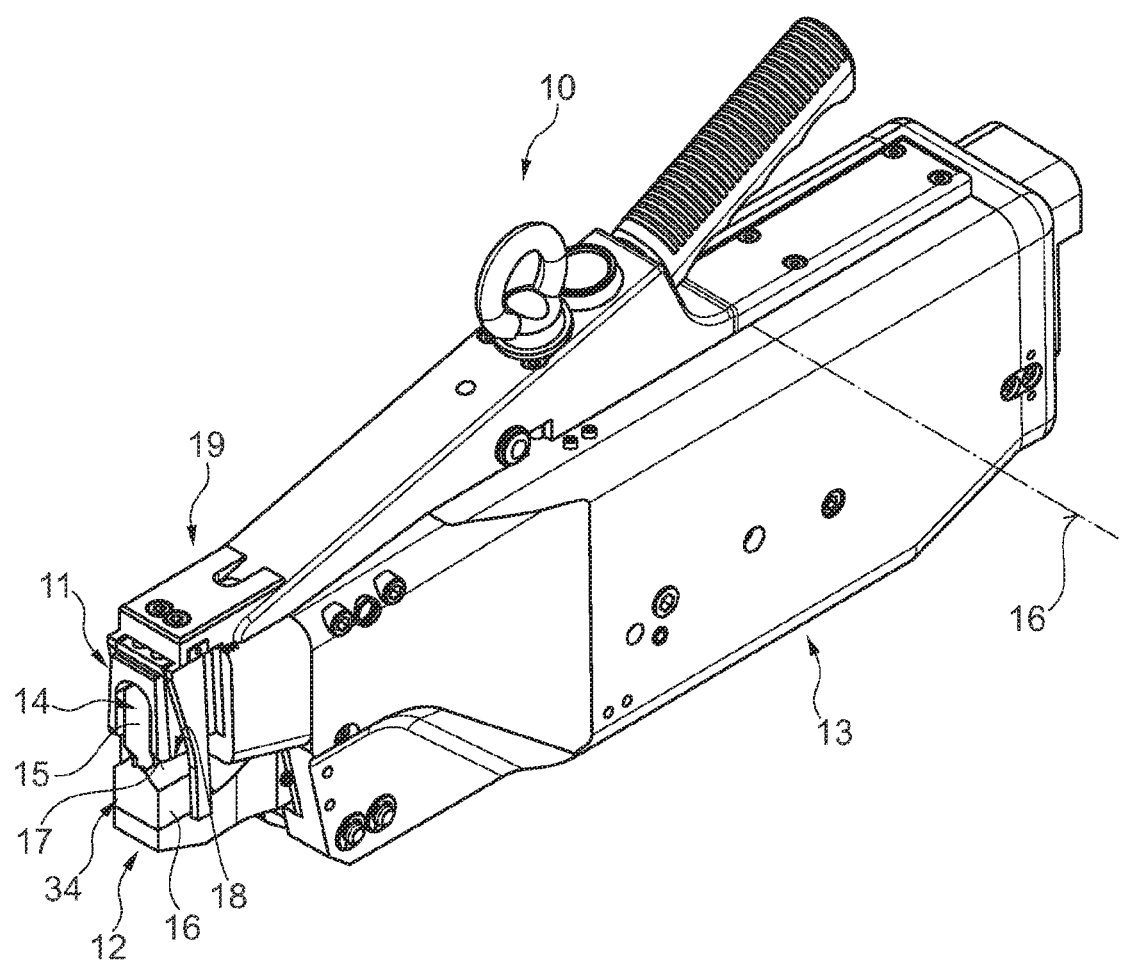
FIG. 1 shows an isometric view of a pair of welding tongs provided with an ultrasonic welding device and having a positioning device disposed at a weldment accommodation formed between a work surface of a sonotrode and an opposing surface of an anvil.

FIG. 1 is an isometric view of a pair of ultrasonic welding tongs 10 which are provided with an ultrasonic welding device 34 and comprise an upper tong part 11 and a lower tong part 12 which are disposed in a shared tong casing 13. Upper tong part 11 comprises a sonotrode 14 of ultrasonic welding device 34, sonotrode 14 being shown without tong casing 13 in particular in FIG. 4 and sonotrode 14 being disposed with a sonotrode head 15 in such a manner vis-à-vis an anvil 16 of ultrasonic welding device 34 formed on lower tong part 12 that a weldment accommodation 19 shown in particular in FIG. 2 is realized between a work surface 17 of sonotrode 14 and an opposing surface 18 of anvil 16.

In the case of the shown exemplary embodiment, anvil 16 can be pivoted about a pivot axis 16, which is realized in the back part of tong casing 13, against sonotrode head 15 of sonotrode 14 by means of an actuating device (not further illustrated) in such a manner that opposing surface 18 formed on anvil 16 can be moved against work surface 17 of sonotrode 14 which emits longitudinal vibrations.

Figure 2:
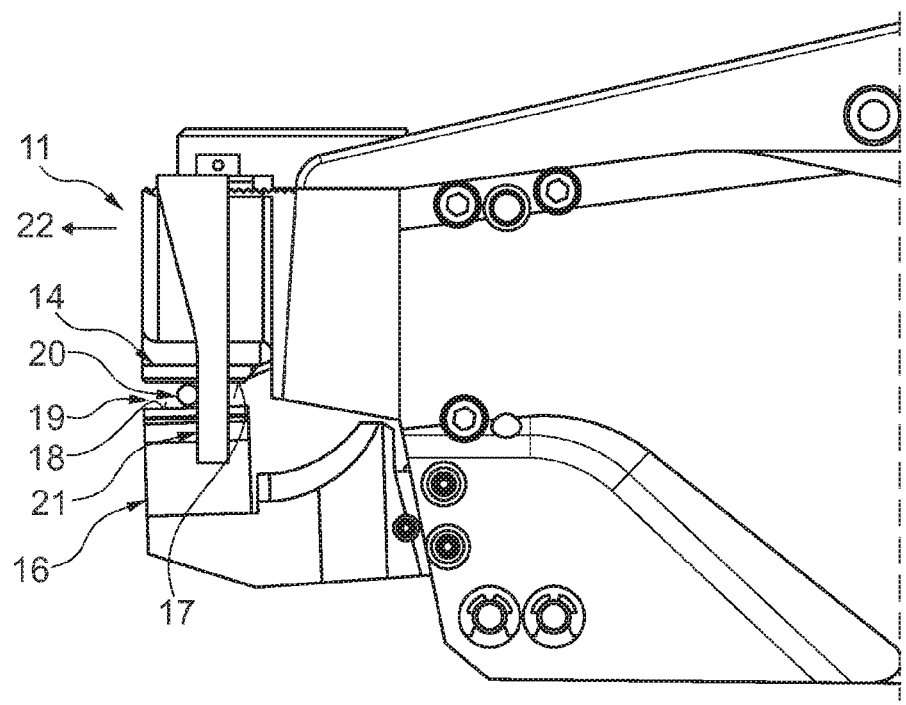
FIG. 2 shows an enlarged lateral view of the weldment accommodation shown in FIG. 1.

As shown in FIG. 2, weldment accommodation 19 realized between work surface 17 of sonotrode 14 and opposing surface 18 of anvil 16 serves for accommodating a weldment 20 realized as a metal tubelet in this instance. As can be further seen in FIG. 2, upper tong part 11 is provided with a positioning device 21 which can be changed in longitudinal direction 22 of sonotrode 14 in its relative position in such a manner that, as can be seen in particular in FIG. 4, positioning device 21 can be abutted against weldment 20 disposed in a weld position P1 in weldment accommodation 19.

Figure 4:
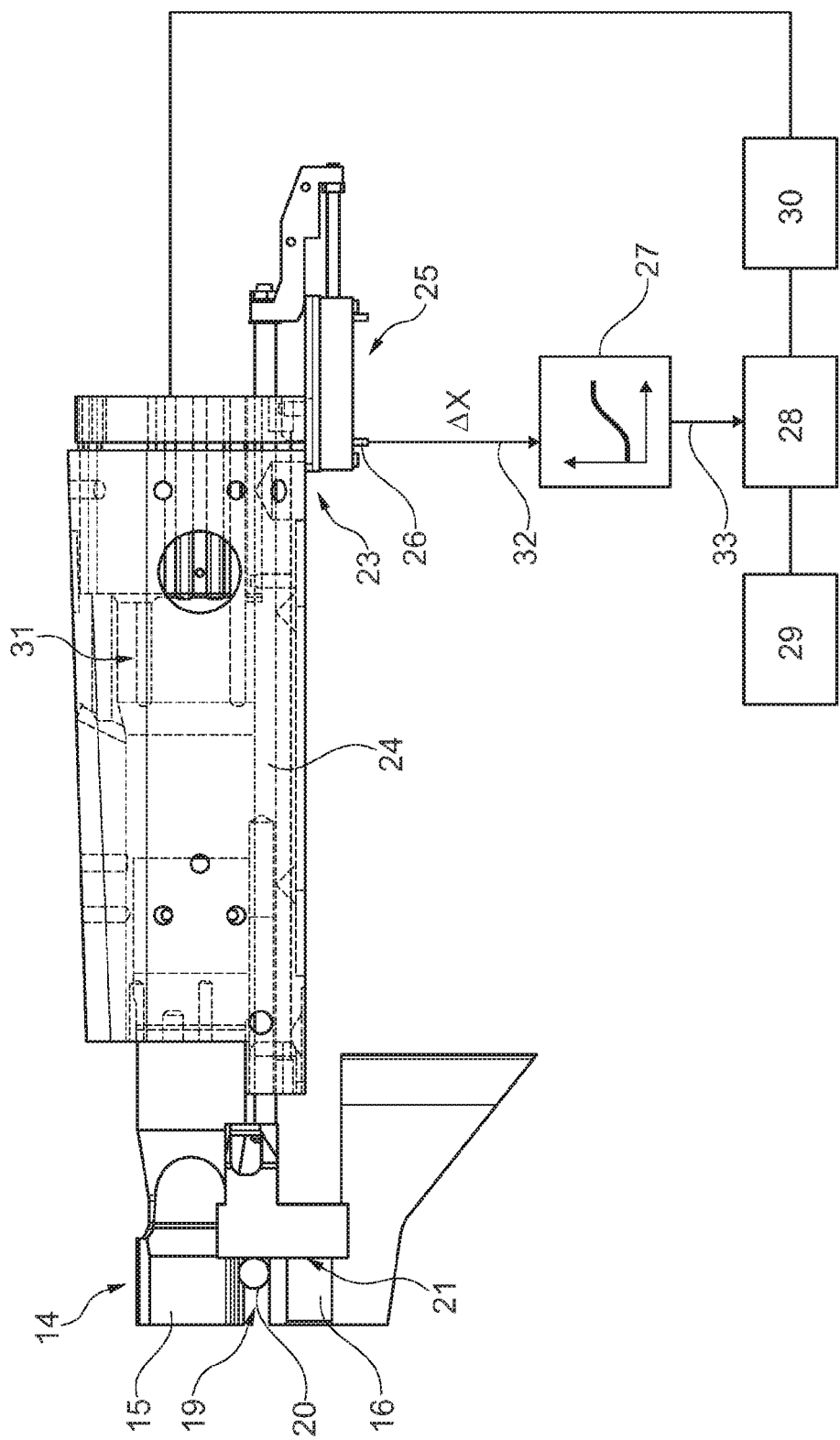
FIG. 4 shows a schematic illustration of the positioning device provided with a position sensor and intended for defining a weld position in the weldment accommodation.

In FIG. 4, which shows ultrasonic welding device 34 of ultrasonic welding tongs 10 without tong casing 13 shown in FIG. 1, positioning device 21 is provided with a position sensor 23 which comprises a transmitting element realized as a coupling rod 24 in this instance and comprises a potentiometer device 25 connected to positioning device 21 via coupling rod 24.

Ultrasonic welding device 34 schematically shown in FIG. 4 comprises a characteristic curve processor 27 which is connected to a signal output 26 of position sensor 23 and is connected to a generator 28 in the present instance. Generator 28 is connected to a computer 29 which enables specifying defined welding parameters. According to the power output of generator 28, ultrasonic vibrations are generated by means of a converter 30 which are ultimately transmitted to sonotrode 14 and its work surface 17 via a booster 31, which causes an amplitude amplification of the ultrasonic vibrations generated by means of converter 30.

An amplitude characteristic curve specific to sonotrode 14 is stored in characteristic curve processor 27 depending on the amplitude size across the length of the sonotrode work surface 17 in longitudinal direction 22 of sonotrode 14.

Figure 3:
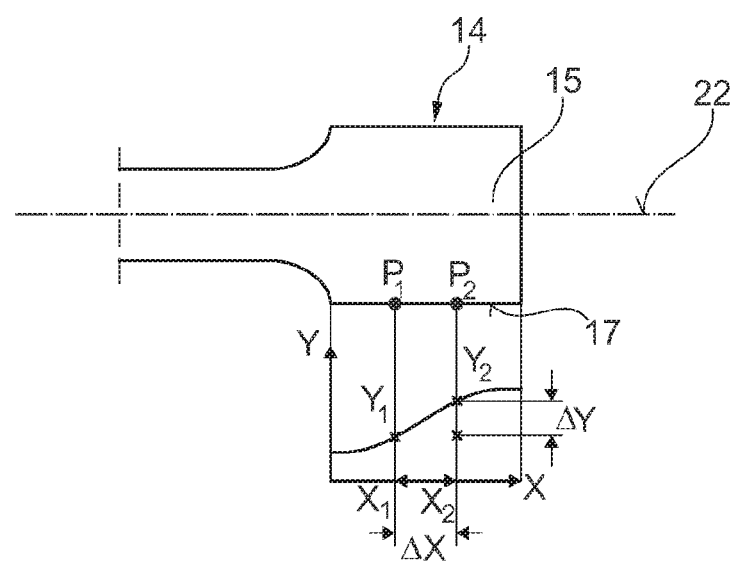
FIG. 3 shows an amplitude characteristic curve shown across a work surface of a sonotrode, including a presentation of the amplitude progress in the longitudinal direction of the work surface.

To explain the above term "amplitude characteristic curve specific to [the] sonotrode", FIG. 3 shows the amplitude characteristic curve over work surface 17 of sonotrode 14, it becoming clear that an explicit functional connection exists between the path co-ordinate x extending in longitudinal direction 22 on work surface 17 and amplitude measurement y so that an amplitude measurement $y_1$ can be allocated to path coordinate $x_1$, which defines a weld position $P_1$ on work surface 17, as shown in FIG. 3 in an exemplary manner, and an amplitude measurement $y_2$ can be allocated to a path co-ordinate $x_2$, which defines a weld position $P_2$ on work surface 17. Ergo, a change in amplitude $\Delta y$, which is an increase in amplitude as FIG. 3 shows in this present instance, is between positions $P_1$ and $P_2$, the change in amplitude $\Delta y$ being based on change in position $\Delta x$.

Characteristic curve processor 27 which is schematically shown in FIG. 4 can control the power output of generator 28 according to the amplitude characteristic curve, for example effecting a reduction of the vibration amplitude of converter 30 by reducing the voltage of generator 28 in conjunction with a corresponding reduction of the power output of generator 28. For this purpose, characteristic curve processor 27 generates an output signal 33, which corresponds to change in amplitude $\Delta y$, depending on an input signal 32 corresponding to the change in position $\Delta x$, output signal 33 influencing the power output of generator 28 in such a manner that an amplitude reduction—$\Delta y$ corresponding to the amplitude increase $\Delta y$ is performed in position $P_2$ so that the same amplitude is applied to the weldment disposed in position $P_2$ as in position $P_1$. Thus the change in amplitude $\Delta y$ is compensated according to the amplitude characteristic curve specific to the sonotrode so that welds can be implemented at the same amplitude independently of weld position $P_1$ or $P_2$.

Diverting from the schematic presentation in FIG. 4, the characteristic curve processor can also be functionally integrated in computer 29 so that the input signal according to the change in position $\Delta x$ can also be directly supplied as an input variable to computer 29 for the realization of the ultrasonic welding device.

The invention claimed is:

1. A method for positioning weldments (20) in an ultrasonic welding device (34) comprising a sonotrode (14), to which ultrasonic vibrations are applied and which emits longitudinal vibrations, and an anvil (16), a weldment accommodation (19) being formed between a work surface (17) of the sonotrode (14) and an opposing surface (18) of the anvil (16), wherein a position of a movable positioning device (21) along a longitudinal direction (22) of the sonotrode defines a movable weld position P of the weldment (20) being captured in the longitudinal direction (22) of the sonotrode (14) by means of a position sensor, characterized in that application of vibrations to the sonotrode (14) is changed such that a change in position $\Delta x$ of the weld position P along the longitudinal direction (22) of the sonotrode results in a change in amplitude $\Delta y$ of the ultrasonic vibrations according to an amplitude characteristic curve of the sonotrode (14).

2. The method according to claim 1, characterized in that the application of vibrations to the sonotrode (14) is changed due to a change in the electric voltage of a generator (28) which controls a converter (30) which applies ultrasonic vibrations to the sonotrode (14).

3. The method according to claim 1, characterized in that the change in position $\Delta x$ of the weld position P is performed in conjunction with a corresponding change in amplitude $\Delta y$ of the ultrasonic vibrations depending on a defined number of welds.

4. The method according to claim 1, characterized in that the change in position $\Delta x$ of the weld position P is performed in conjunction with a corresponding change in amplitude $\Delta y$ of the ultrasonic vibrations after a change in position has been triggered by a user of the ultrasonic welding device.

5. An ultrasonic welding device (34) comprising a sonotrode (14), to which ultrasonic vibrations are applied and which emits longitudinal vibrations, and an anvil (16), a weldment accommodation (19) being formed between a work surface (17) of the sonotrode (14) and an opposing surface (18) of the anvil (16), the ultrasonic welding device (34) comprising a movable positioning device (21) for capturing weld position P of the weldment (20) with respect to the work surface (17) in the longitudinal direction (22) of the sonotrode (14), the movable positioning device (21) being provided with a position sensor (23) for capturing a movable weld position P along a longitudinal direction of the sonotrode (14), characterized in that the position sensor (23) is connected to a generator (28) of the ultrasonic weld device (34) via a characteristic curve processor (27) in such a manner that a change in amplitude $\Delta y$ of the ultrasonic vibrations is performed according to an amplitude characteristic curve of the sonotrode (14) by means of the characteristic curve processor (27), wherein the change in amplitude $\Delta y$ of the ultrasonic vibrations depends on a change in position $\Delta x$ of the weld position P along the longitudinal direction of the sonotrode (14).

6. The ultrasonic device (34) according to claim 5, characterized in that the characteristic curve processor (27) is developed in a computer (29) which is connected to a generator (28) which controls a converter (30) which applies ultrasonic vibrations to the sonotrode (14).

\* \* \* \* \*